US009316720B2

(12) United States Patent
Rasband

(10) Patent No.: US 9,316,720 B2
(45) Date of Patent: Apr. 19, 2016

(54) CONTEXT SPECIFIC MANAGEMENT IN WIRELESS SENSOR NETWORK

(71) Applicant: Paul B. Rasband, Lantana, FL (US)

(72) Inventor: Paul B. Rasband, Lantana, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 59 days.

(21) Appl. No.: 14/463,733

(22) Filed: Aug. 20, 2014

(65) Prior Publication Data
US 2015/0287303 A1 Oct. 8, 2015

Related U.S. Application Data

(60) Provisional application No. 61/973,962, filed on Apr. 2, 2014, provisional application No. 61/946,054, filed on Feb. 28, 2014.

(51) Int. Cl.
G08B 13/00 (2006.01)
G01S 5/02 (2010.01)
G08B 25/10 (2006.01)
G06N 5/02 (2006.01)
H04L 29/08 (2006.01)
H04W 84/18 (2009.01)
G08B 7/06 (2006.01)
G08B 13/196 (2006.01)
H04N 7/18 (2006.01)
G08B 13/22 (2006.01)
G08B 13/24 (2006.01)
H04L 12/741 (2013.01)
(Continued)

(52) U.S. Cl.
CPC .............. *G01S 5/0294* (2013.01); *G01S 5/02* (2013.01); *G01S 5/0236* (2013.01); *G01S 5/0284* (2013.01); *G06K 9/00* (2013.01); *G06N 5/027* (2013.01); *G08B 7/062* (2013.01); *G08B 13/00* (2013.01); *G08B 13/19613* (2013.01); *G08B 13/22* (2013.01); *G08B 13/2491* (2013.01); *G08B 25/10* (2013.01); *H04L 45/74* (2013.01); *H04L 67/10* (2013.01); *H04N 7/181* (2013.01); *H04W 84/18* (2013.01); *H04W 88/16* (2013.01)

(58) Field of Classification Search
CPC .............. G06F 9/3406; G08B 13/2428; G08B 13/2491
USPC ............. 340/541, 568.1, 572.2, 572.4, 572.7, 340/5.61
See application file for complete search history.

(56) References Cited

U.S. PATENT DOCUMENTS 6,952,574 B2 10/2005 Tealdi et al.
7,474,330 B2 1/2009 Wren et al.
(Continued)

OTHER PUBLICATIONS

PCT International Search Report and Written Report PCT/US2015/017221.

Primary Examiner — Tai T Nguyen
(74) Attorney, Agent, or Firm — Fish & Richardson P.C.

(57) ABSTRACT

A networked system for managing a physical intrusion detection/alarm includes an upper tier of server devices, comprising: processor devices and memory in communication with the processor devices, a middle tier of gateway devices that are in communication with upper tier servers, and a lower level tier of devices that comprise fully functional nodes and constrained nodes. The networked has a device configured to receive sensory inputs from credentials or badges and determine virtual groups of individuals associated with received credential data and apply rules to grouping information to track and detect individuals within virtual groups.

20 Claims, 5 Drawing Sheets

(51) Int. Cl.
*H04W 88/16* (2009.01)
*G06K 9/00* (2006.01)

(56) References Cited

U.S. PATENT DOCUMENTS

| | | |
|---|---|---|
| 8,164,443 B2 | 4/2012 | Alston et al. |
| 8,611,323 B2 | 12/2013 | Berger et al. |
| 8,630,820 B2 | 1/2014 | Amis |
| 8,634,788 B2 | 1/2014 | Wright et al. |
| 8,643,719 B2 | 2/2014 | Vian et al. |
| 8,707,431 B2 | 4/2014 | Stephens et al. |
| 8,732,255 B2 | 5/2014 | Odio |
| 2003/0216144 A1 | 11/2003 | Roese et al. |
| 2006/0059557 A1 | 3/2006 | Markham et al. |
| 2007/0106775 A1 | 5/2007 | Wong |
| 2007/0186106 A1 | 8/2007 | Ting et al. |
| 2011/0109434 A1* | 5/2011 | Hadsall, Sr. ........... G08B 21/22 340/8.1 |
| 2012/0159579 A1 | 6/2012 | Pineau et al. |
| 2012/0197986 A1 | 8/2012 | Chen et al. |

* cited by examiner

CONTEXT SPECIFIC MANAGEMENT IN WIRELESS SENSOR NETWORK

CLAIM OF PRIORITY

This application claims priority under 35 U.S.C. §119(e) to provisional U.S. Patent Application 61/973,962, filed on Apr. 2, 2014, entitled: "Wireless Sensor Network", and provisional U.S. Patent Application 61/946,054, filed on Feb. 28, 2014, entitled: "Wireless Sensor Network", the entire contents of which are hereby incorporated by reference.

BACKGROUND

This description relates to operation of security systems in particular intrusion systems.

It is common for businesses and homeowners to have a security system for detecting alarm conditions at their premises and signaling the conditions to a monitoring station or to authorized users of the security system. Security systems often include an intrusion detection panel that is electrically or wirelessly connected to a variety of sensors. Those sensors types typically include motion detectors, cameras, and proximity sensors (used to determine whether a door or window has been opened). Typically, such systems receive a very simple signal (electrically open or closed) from one or more of these sensors to indicate that a particular condition being monitored has changed or become unsecure.

Government entities, companies, academic institutions, etc. issue credentials to employees, contractors, students, etc. to control access to buildings and facilities, indoors and outdoors. Individuals who bypass security systems to gain access, either intentionally or unintentionally, are difficult to identify and locate. Applications can use data and information related to the location and disposition of individuals (people) in a building or other type of locale for various purposes.

SUMMARY

Wireless sensor networks in examples of applications include area access control (door locks, etc.), intrusion detection (door locks, window locks, proximity sensing), fire safety (smoke detectors) and so on. Wireless networks could also be used to track the location of people inside a building or at a site using various triangulations and ranging methods. Disclosed are techniques by which inferences of high-level information can be determined from low-level sensor data by providing techniques to derive useful information from raw data sensor outputs and reports from nodes in a wireless sensor network, as the data relates to positions of individuals within a monitored area.

According to an aspect, a networked system for physical intrusion detection/alarm monitoring includes one or more computing devices configured to receive sensory inputs from credentials or badges within a monitored premises, determine virtual groups of individuals associated with the received credential data by determining from the received inputs relative proximity of individuals to each other over periods of time, store the determined virtual groups of individuals into a list of tag locations, modify over time frames of configurable duration the virtual groupings by changing the list of tag locations for each virtual group as virtual group membership changes, and apply rules set to the grouping information to track and detect individuals within the virtual group.

According to an additional aspect, a method of detection of physical intrusion within a monitored area includes receiving by one or more computing devices, sensory inputs from credentials or badges within a monitored premises, determining by the one or more computing devices, virtual groups of individuals associated with the received credential data by determining from the received inputs relative proximity of individuals to each other over periods of time, storing by the one or more computing devices, the determined virtual groups of individuals into a list of tag locations, modify by the one or more computing devices over time frames of configurable duration the virtual groupings by changing the list of tag locations for each virtual group as virtual group membership changes, and applying by the one or more computing devices, rules set to the grouping information to track and detect individuals within the virtual group.

One or more of the following advantages may be provided by one or more of the above aspects.

The approach groups individuals into virtual groups over relatively short time frames of configurable duration. With the use of that grouping information the techniques functionality determine status of individuals in the groups. The groupings are dynamic in that the groupings form, dissolve, and otherwise change in real-time as new information is made available regarding the current location of individuals. The groups are "fuzzy" in that a given individual may be assigned to a group with a certain degree of certainty/uncertainty derived from past experience. This management of groups of individuals provides value to low level applications. The approach uses rules or sets of rules (composite rules) residing in either a single device or distributed over many devices (i.e., in the application layer software of a set of end-nodes, or other combinations of network nodes and hosts) to define just what comprises a test for virtual group membership. These rules can be implemented using application code modules loaded into the various devices and changed over time, using real-time code relocation and execution (dynamic programming).

The details of one or more embodiments of the invention are set forth in the accompanying drawings and the description below. Other features, objects, and advantages of the invention are apparent from the description and drawings, and from the claims.

DETAILED DESCRIPTION

Described herein are examples of network features that may be used in various contexts including, but not limited to, security/intrusion and alarm systems. Example security systems may include an intrusion detection panel that is electrically or wirelessly connected to a variety of sensors. Those sensors types may include motion detectors, cameras, and proximity sensors (used, e.g., to determine whether a door or window has been opened). Typically, such systems receive a relatively simple signal (electrically open or closed) from one or more of these sensors to indicate that a particular condition being monitored has changed or become unsecure.

For example, typical intrusion systems can be set-up to monitor entry doors in a building. When a door is secured, a proximity sensor senses a magnetic contact and produces an electrically closed circuit. When the door is opened, the proximity sensor opens the circuit, and sends a signal to the panel indicating that an alarm condition has occurred (e.g., an opened entry door).

Data collection systems are becoming more common in some applications, such as home safety monitoring. Data collection systems employ wireless sensor networks and wireless devices, and may include remote server-based monitoring and report generation. As described in more detail below, wireless sensor networks generally use a combination of wired and wireless links between computing devices, with wireless links usually used for the lowest level connections (e.g., end-node device to hub/gateway). In an example network, the edge (wirelessly-connected) tier of the network is comprised of resource-constrained devices with specific functions. These devices may have a small-to-moderate amount of processing power and memory, and may be battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Figure 1:
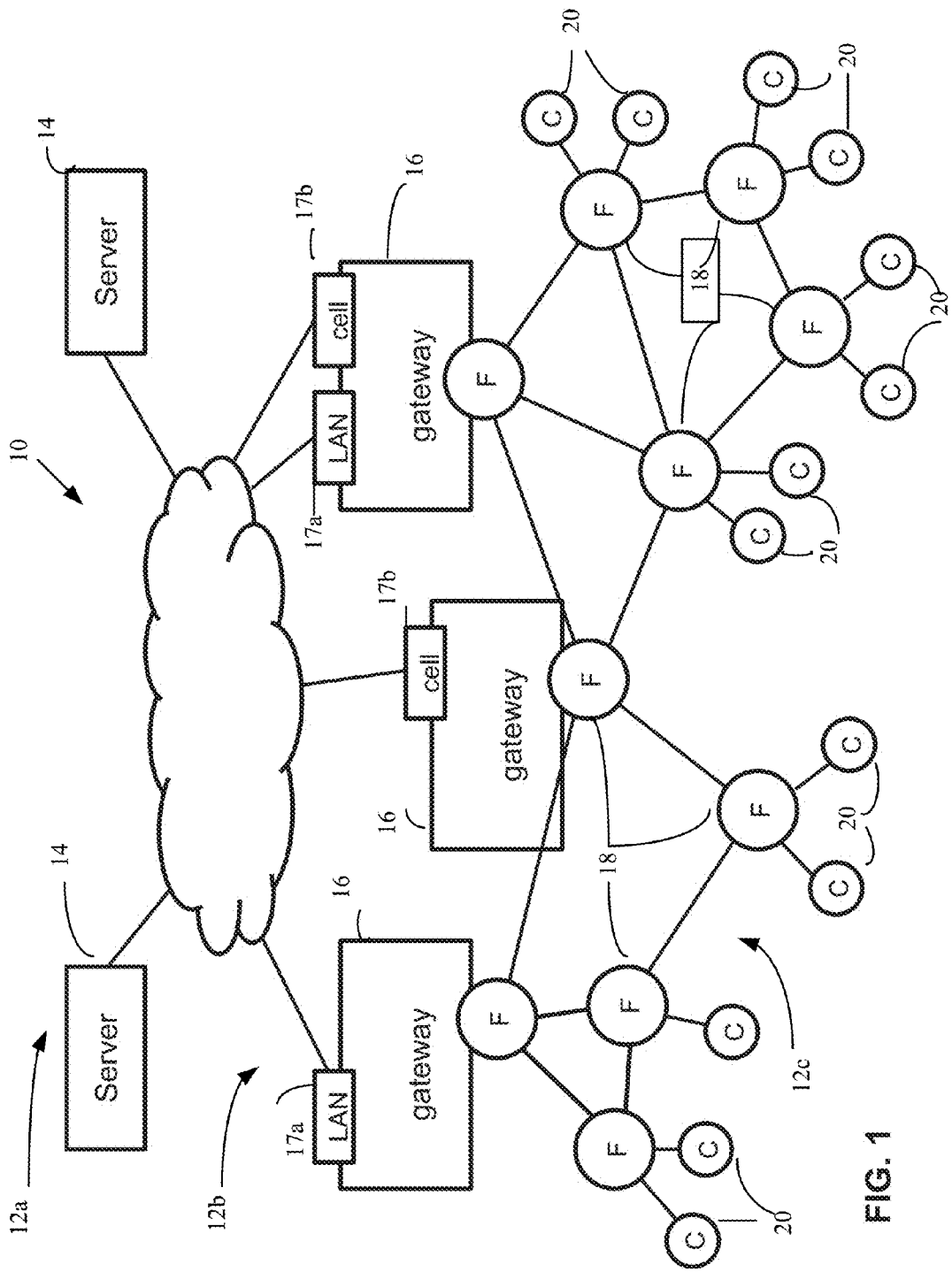
FIG. 1 is a schematic diagram of an exemplary networked security system.

Referring now to FIG. 1, an exemplary (global) distributed network 10 topology for a Wireless Sensor Network (WSN) is shown. In FIG. 1 the distributed network 10 is logically divided into a set of tiers or hierarchical levels 12a-12c. In an upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below.

The distributed network 10 includes a second logically divided tier or hierarchical level 12b, referred to here as a middle tier that involves gateways 16 located at central, convenient places inside individual buildings and structures. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F") as well as constrained wireless sensor nodes or sensor end-nodes 20 (marked in the FIG. 1 with "C"). In some embodiments wired sensors (not shown) can be included in aspects of the distributed network 10.

Constrained computing devices 20 as used herein are devices with substantially less persistent and volatile memory other computing devices, sensors in a detection system. Currently examples of constrained devices would be those with less than about a megabyte of flash/persistent memory, and less than 10-20 kbytes of RAM/volatile memory). These constrained devices 20 are configured in this manner; generally due to cost/physical configuration considerations.

In a typical network, the edge (wirelessly-connected) tier of the network is comprised of highly resource-constrained devices with specific functions. These devices have a small-to-moderate amount of processing power and memory, and often are battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Each gateway is equipped with an access point (fully functional node or "F" node) that is physically attached to that access point and that provides a wireless connection point to other nodes in the wireless network. The links (illustrated by lines not numbered) shown in FIG. 1 represent direct (single-hop network layer) connections between devices. A formal networking layer (that functions in each of the three tiers shown in FIG. 1) uses a series of these direct links together with routing devices to send messages (fragmented or non-fragmented) from one device to another over the network.

The WSN 10 implements a state machine approach to an application layer that runs on the lower tier devices 18 and 20. Discussed below is an example of a particular implementation of such an approach. States in the state machine are comprised of sets of functions that execute in coordination, and these functions can be individually deleted or substituted or added, by a manager program to in order to alter the states in the state machine of a particular lower tier device.

The WSN state function based application layer uses an edge device operating system (not shown, but such as disclosed in the above mentioned provisional application) that allows for loading and execution of individual functions (after the booting of the device) without rebooting the device (so-called "dynamic programming"). In other implementations, edge devices could use other operating systems provided such systems allow for loading and execution of individual functions (after the booting of the device) preferable without rebooting of the edge devices.

Figure 2:
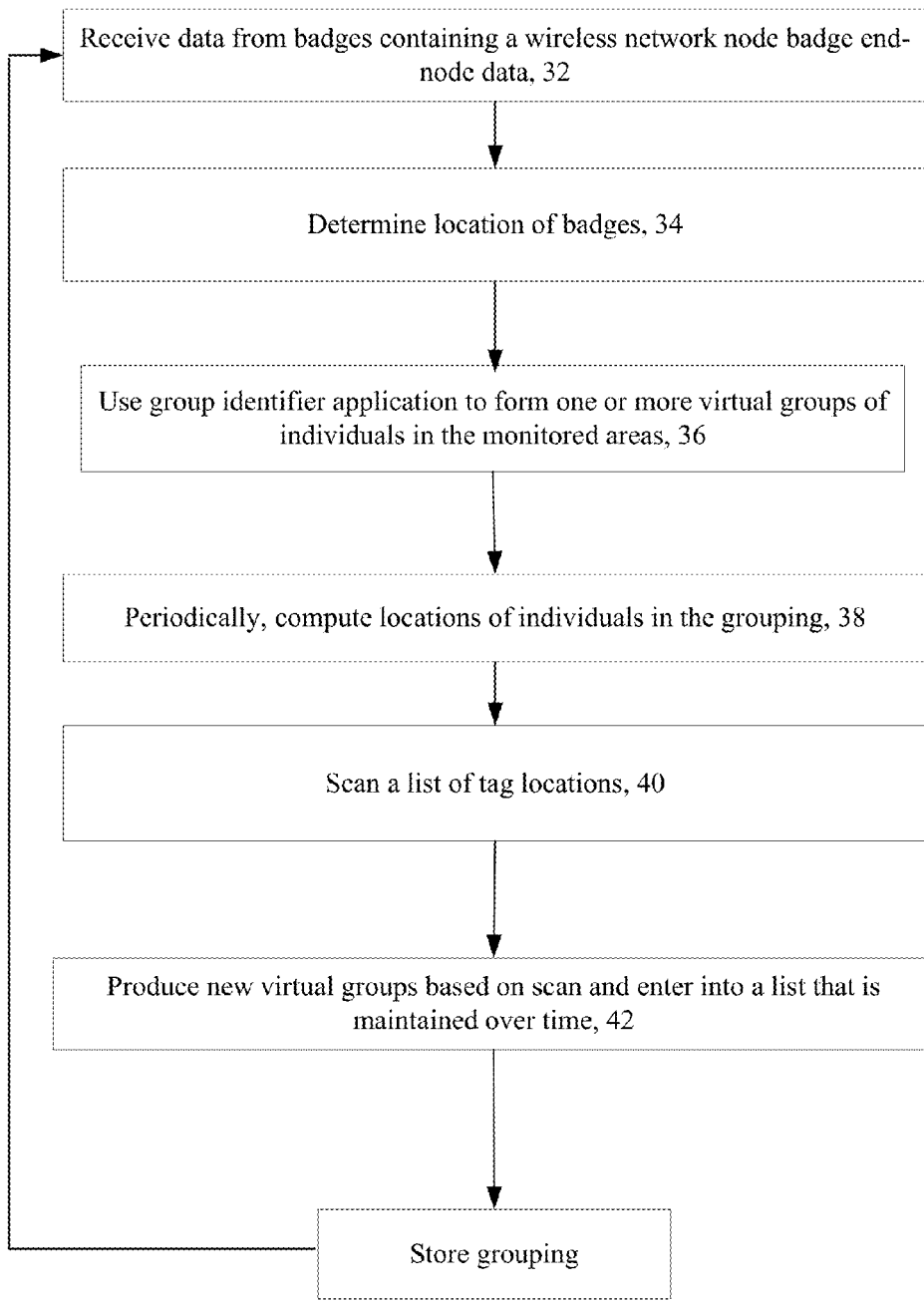
FIG. 2 is a flow chart depicting context specific management processing.

Referring now to FIG. 2, context specific management involves grouping of individuals into virtual groups over relatively short time frames of configurable duration, and the use of grouping information to track and detect individuals, e.g., non-credentialed individuals or credentialed individuals in unauthorized areas, etc. The context specific management can use the information obtained from sensors as discussed above. Duration of groupings can be fixed, preselected or user-selectable. Context specific management processing can be executed on any of the systems mentioned in FIG. 1 or equivalent systems.

Context specific management can be explained as follows. Three individuals are walking down a hallway in a building, each of whom is wearing a name tag or badge containing a wireless network node that when read by a tag reading sensor produces a message with data that identifies the individual to whom the badge or tag was assigned. This read data is received 32 by a server or gateway from one or more tag reading sensors as each individual wearing the badge (WSN end-node) moves down the hallway and throughout the building. As the badge is read by sensor nodes in the network (FIG. 1), the precise badge locations can be determined 34 by various techniques such as triangulation, TX power level sweeping, and/or combinations of other methods to pinpoint with some defined precision, the location of the badge in the building hallway. (The degree of precision is principally related to the number, spacing, accuracy, etc. of individual sensor nodes, as well as the range and coverage of such nodes and thus is implementation specific.)

Messages are produced by the mobile nodes (name badge nodes) and passed to other sensor network nodes in the wireless network discussed above. In the embodiment of the network of FIG. 1, nodes in the network (e.g., fixed sub-coordinator nodes, other end-nodes at fixed locations acting as location reference points and so forth) process these messages without continual involvement of systems at the higher tiers, e.g., the first and second tiers. However, at points in time the raw messages and/or results provided from processing the messages from the nodes are sent to one or more network gateways in the network. In, e.g., the server, the server executes a group identifier application. With other networks different arrangements are possible.

Thus, after a period of time (perhaps 30 to 60 seconds) inputs from the nodes are received by the server and the group identifier application 36 running in the server computes and re-computes 38 the location of each of the three individuals a number of times. This group identifier application continually scans 40 a list of tag locations "tag location list" built from the messages passed among the nodes and between the nodes and the gateway, and determines a correlation related to the three badge nodes—namely that they are all within or nearly within the limits of location resolution of the overall system (i.e., in the same general area) for a series of different locations and/or times, and according to its current threshold values and logic the group identifier app produces a virtual group 42 comprised of the three individuals.

This virtual grouping is a record or other structure (shown below as a table) stored on computer storage, e.g., in a database etc. that includes the Tags associated with the group, the location where each tag was read, "Tag location" and the time of reading the tag "Time" and enters this into the tag location list that the group identifier application maintains over time. The tag location list can take many different forms. For example, a tag location list can comprise a list such as below:

| tag location list | | |
|---|---|---|
| Tags | Tag location | Time |
| Tag_1 | | |
| * | * | * |
| * | * | * |
| * | * | * |
| Tag_n | | |

Virtual Groups are produced by examining the tag information and such groups can be tracked as in the table below:

| Virtual Groups | | |
|---|---|---|
| Virtual Group Id | Tags | Time |
| Virtual Group Id_1 | Tag_2; Tag_3; Tage_9 | |
| * | * | * |
| * | * | * |
| * | * | * |
| Virtual Group Id_n | | |

Tags will have associated information that includes the assigned user or possessor of the tag, e.g., dept. information and so forth.

| Tag_1 | | |
|---|---|---|
| User name | Dept. | **** |

These virtual grouping are continually updated and modified with new virtual groupings added and older virtual groupings deleted according to received data and specific\rules applied to the data.

The groupings are dynamic in that they form, dissolve, and otherwise change in real-time as new information is made available regarding the current location of the various individuals involved. The groupings are also "fuzzy" (borrowing a term from applied artificial intelligence) in that a given individual may be assigned to a group with a certain degree of certainty/uncertainty derived from past experience.

Rules can be established for determining virtual groupings. For example, one individual observed to be in close proximity to another individual for a very brief moment in time (during one location computation period if the locations are recomputed for all people in the building every 15 seconds for example) has a relatively small chance of being in a real group (i.e., there is a small chance that the same two individuals will be at the same location in the next location computation period). If two individuals are identified at the same location for two consecutive computation periods there is a somewhat greater chance that they will be observed together in the third computation period (that is, 2 periods together infers a 3rd with greater success than 1 period together infers a 2nd period together). The relative chances or N to N+1 correlation can be computed using historical data and regression techniques by the group identifier app or other computation modules.

In one implementation example, a user could supply a threshold value during application configuration, e.g., if there is a 90% chance that two individuals will be observed together in the next location computation period then they are by definition members of a common virtual group.

The Context specific management also includes the use of rules or sets of rules (composite rules) residing in either a single device or distributed over many devices (i.e., in the application layer software of a set of end-nodes, or other combinations of network nodes and hosts) to define just what comprises a test for virtual group membership. These rules can be implemented using application code modules loaded into the various devices and changed over time, using real-time code relocation and execution (dynamic programming).

More specifically, if one fixed infrastructure node identifies two mobile nodes together at time 1, and a second fixed infrastructure node identifies the same two mobile nodes together at time 2, the data is pooled or compared before it is possible for the group identifier application to recognize that the same two mobile nodes have been observed together during two consecutive location computation periods. This can be done in fixed node 1 after a message sent to it by fixed node 2, or it can be done in fixed node 2 after a message sent to it by fixed node 1, or it can be done in some other node (e.g., a parent node such as a common sub-coordinator) after messages are sent to it by both fixed node 1 and fixed node 2.

The process of defining virtual groups can be done in analogous but more complex ways by each fixed node in a network reporting in broadcast mode whenever a mobile node makes a significant change in location. The collection of broadcast messages can be monitored by the set of all nodes, and each node can maintain its own list of virtual groups based on processing performed by that node of which mobile tags have sent messages to that node and which nodes in the set have informed that node and which nodes in the set observed the mobile tags for a certain number of consecutive location computation periods by that node set. (These lists will not all be the same for each fixed node since some fixed nodes cannot necessarily hear other fixed nodes due to range limitations, or because messages are missed to communication interference, and so forth.) Another way is for a central application to monitor all published reports of individual mobile node location through time, and use matrix calculations to determine correlations of locations of two or more mobile nodes.

The application logic for context specific management performs associations based on an associative expectation, meaning that if person 1 travels with person 2 for a period of time, and person 2 travels with person 3 for a period of time (not necessarily the same time), then person 1 can be associated with person 3. It can further be inferred that person 1 knows person 3 if person 1 is frequently observed with person 2, and person 2 with person 3 (though not necessarily person 1 with person 3 directly).

Figure 3:
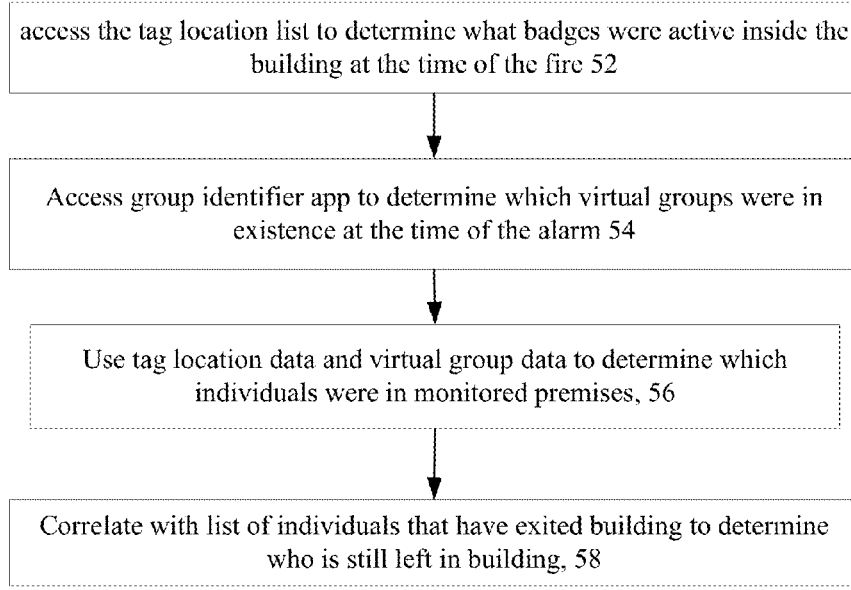
FIG. 3 is a flow chart depicting a particular use of context specific management processing.

Referring now to FIG. 3, at some point there is an alarm event associated with, an emergency condition, e.g., a building fire and evacuation order (any condition can exist, this one is merely explanatory). Outside of the building a fire chief and his/her subordinates are attempting to determine whether everyone has exited the building. At a simple level, an application running on a computer tablet used by the fire fighters accesses 52 the tag location list to determine what badges were active inside the building at the time of the fire, (and to the extent possible what badges are still active inside the building. Furthermore, the application running on the tablet can consult the group identifier app and determine which virtual groups 56 were in existence at the time of the alarm, and consult individuals to determine whether all of the members of each virtual group was observed leaving the building or seen subsequently outside (or perhaps just as importantly, their last known location inside the building as corroborated by a witness/co-member of the virtual group) and data from other virtual groupings. Thus this data is used as input to their inquiries 58 regarding the safe evacuation of people in the building.

Figure 4:
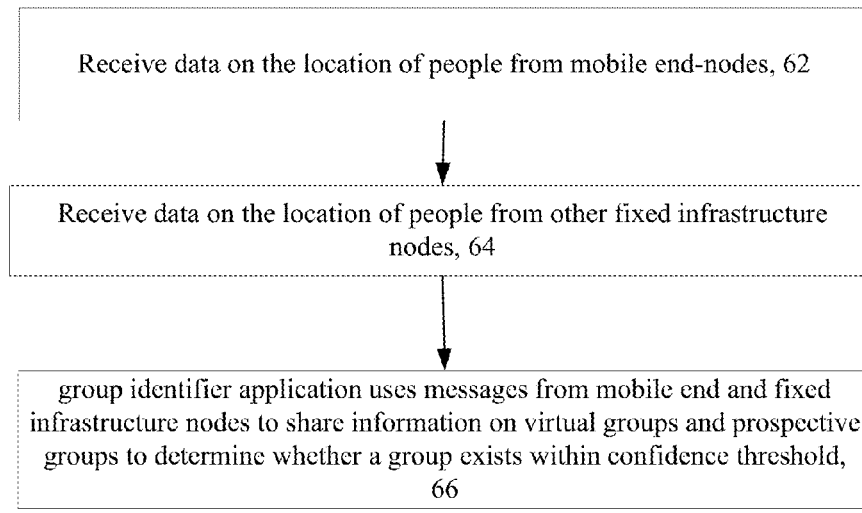
FIG. 4 is a flow chart depicting receiving data for context specific management processing.

Referring to FIG. 4, it is not necessary that all of the location data reside in a single physical device. For example one fixed infrastructure node may have data on the location of some people (mobile end-nodes) 62 while other fixed infrastructure nodes 64 may have data on other mobile nodes at one time, or the same mobile nodes at some different time. The group identifier application may use messages from these and other fixed infrastructure nodes to share information 66 on virtual groups and prospective groups in order to determine whether a group exists within the confidence threshold specified.

In some implementations the video information captured by cameras can be used along with the tag list information to correlate and further manage the context specific locations of individuals.

The nodes may be implemented using any appropriate type of computing device, such as a mainframe work station, a personal computer, a server, a portable computing device, or any other type of intelligent device capable of executing instructions, connecting to a network, and forwarding data packets through the network. The nodes can execute any appropriate computer programs to generate, receive, and transmit data packets for use on the network.

Figure 5:
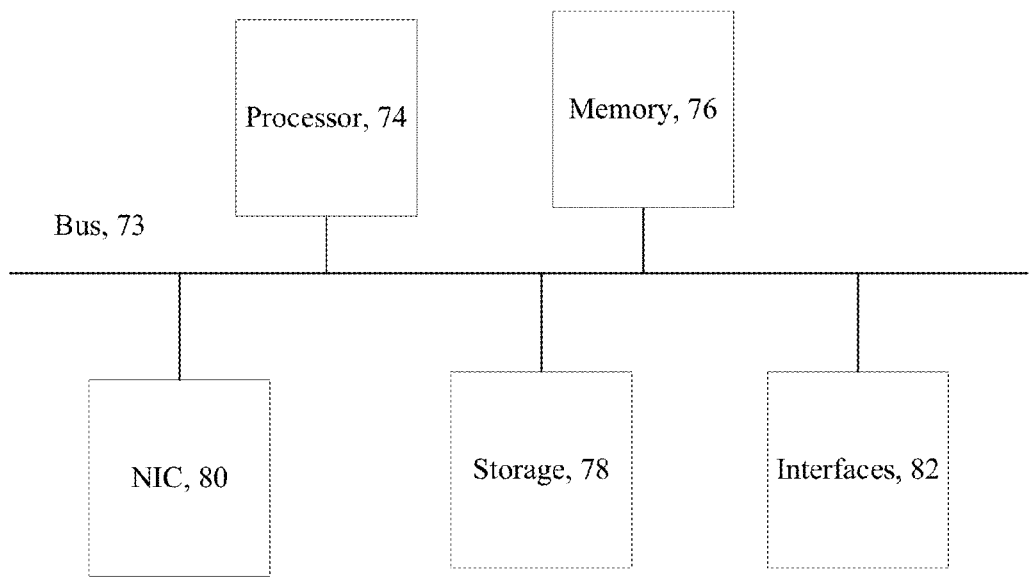
FIG. 5 is a block diagram of a device that executes context specific management processing.

Referring to FIG. 5 exemplary circuitry for a device 70 that executes the context specific management processing 75 is shown. The device 70 includes a processor 74, memory 76, and storage 78 along with a network interface 80 and other interfaces 82 connected via a bus 73 or similar interconnect. The device 70 can be representative of any of the foregoing nodes for execution of the context specific management processing. In addition, a device to access the group identifier application and tag list for use of data produced by context specific processing will have similar circuitry, but will be configured with the processing corresponding to that discussed in FIGS. 3 and 4.

Figure 6:
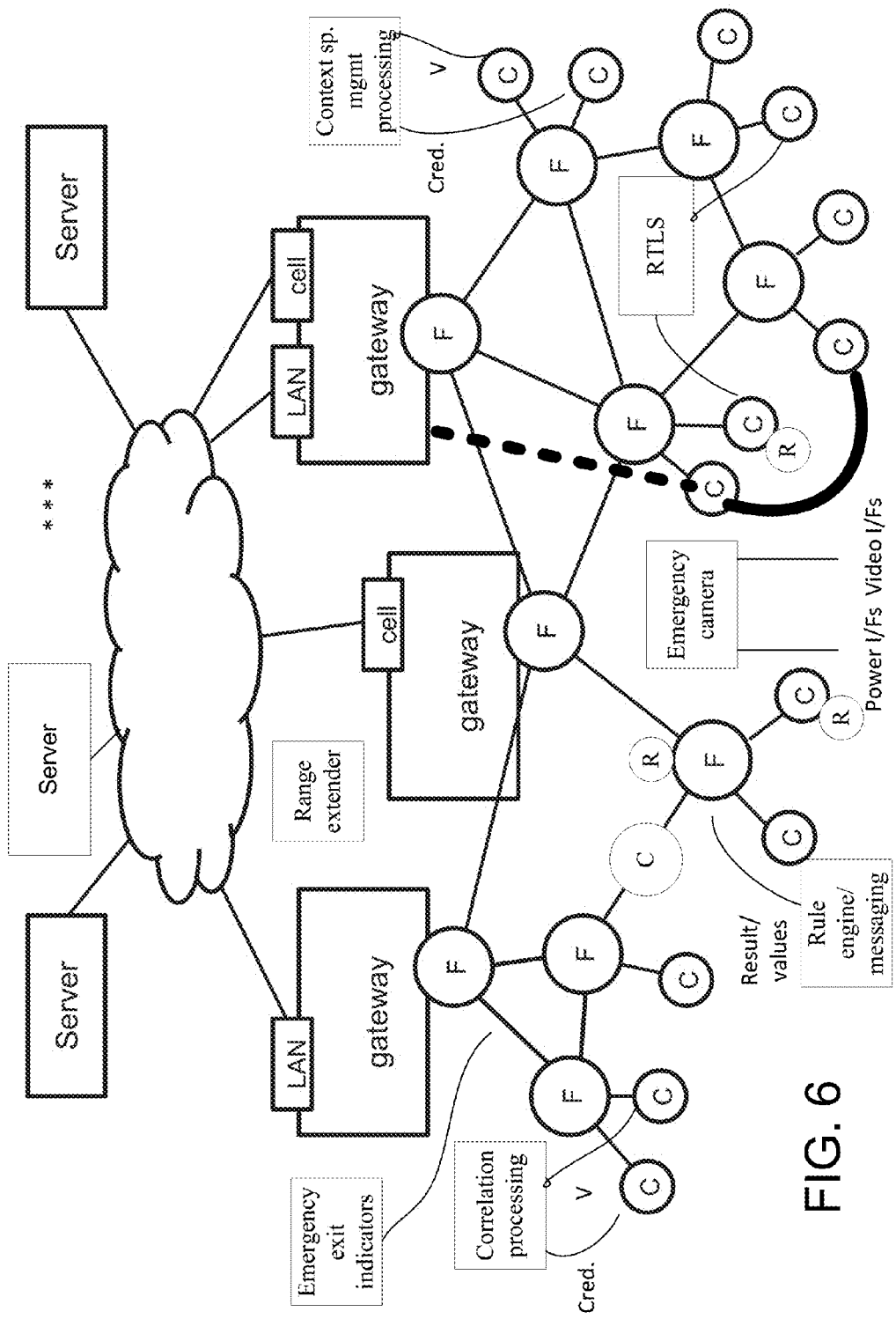
FIG. 6 is a block diagram of components of an example networked security system.

FIG. 6 shows an example of a security system having features of the WSN described with respect to FIGS. 1 to 5 and having the various functionalities described herein. As shown in FIG. 6, correlation processing receives inputs from certain constrained nodes (although these can also be fully functional nodes). These inputs may include credential information and video information, and the correlation processing may produce correlated results that are sent over the network. Context management processing receives inputs from certain constrained nodes (although these can also be fully functional nodes) e.g., credential information and video and grouping information, and performs context processing with results sent over the network. The network supports operation of emergency exit indicators; emergency cameras as well as distributed rule processing and rule engine/messaging processing. Range extenders are used with e.g., gateways, and a real time location system receives inputs from various sensors (e.g., constrained type) as shown. Servers interface to the WSN via a cloud computing configuration and parts of some networks can be run as sub-nets.

The sensors provide in addition to an indication that something is detected in an area within the range of the sensors, detailed additional information that can be used to evaluate what that indication may be without the intrusion detection panel being required to perform extensive analysis of inputs to the particular sensor.

For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Program instructions stored in the memory, along with configuration data may control overall operation of the panel.

The monitoring server includes one or more processing devices (e.g., microprocessors), a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A networked system for physical intrusion detection/alarm monitoring comprises;
   one or more computing devices, comprising processor devices and memory in communication with the processor devices, configured to:
      receive sensory inputs from credentials or badges affixed to individuals containing wireless network nodes within a monitored premises;

determine virtual groups of individuals associated with the received credential data by determining from the received inputs relative proximity of individuals to each other over periods of time;
store the determined virtual groups of individuals into a list of tag locations as grouping information;
modify the grouping information over time frames of configurable duration, based on the virtual groupings by changing the list of tag locations for each virtual group as virtual group membership changes; and
apply rules set to the grouping information to track and detect individuals within the virtual group.

2. The networked system of claim 1 wherein locations of individuals are determined by triangulation of credential data from at least one of plural credential reading devices or transmission power level sweeping.

3. The networked system of claim 1 wherein messages are passed between name badge nodes and other sensor network nodes in a premises that is monitored.

4. The networked system of claim 1, further comprising:
a network gateway, and wherein after a period of time an application running in the network gateway computes the location of each of the individuals and a group identifier application scans the list of tag locations.

5. The networked system of claim 1 wherein the groupings are dynamic in that the groupings form, dissolve, and otherwise change in real-time as new information is made available regarding current locations of the individuals.

6. The networked system of claim 1 wherein the groupings are "fuzzy" in that a given individual is assigned to a group with a certain degree of certainty/uncertainty derived from past experience.

7. The networked system of claim 1 wherein the one or more computing devices are further configured to:
apply rules to define a test for virtual group membership.

8. The networked system of claim 1 wherein the one or more computing devices is a single device in the networked system.

9. The networked system of claim 1 wherein the one or more computing devices is a plurality of distributed devices of a set of end-nodes and combinations of network nodes and hosts.

10. The networked system of claim 1 wherein the rules applied are context specific rules or sets of rules that are application code modules loaded into the devices and that change over time, using real-time code relocation and execution.

11. The networked system of claim 1 wherein the rules applied are context specific rules or sets of rules that are application code modules loaded into the devices and that change over time, using real-time code relocation and execution and with the context specific rule implement application logic for context specific management to determine associations among individuals based on a determined associative expectation.

12. A method of detection of physical intrusion within a monitored area, the method comprising:
receiving by one or more computing devices, sensory inputs from credentials or badges affixed to individuals containing wireless network nodes within a monitored premises;
determining by the one or more computing devices, virtual groups of individuals associated with the received credential data by determining from the received inputs relative proximity of individuals to each other over periods of time;
storing by the one or more computing devices, the determined virtual groups of individuals into a list of tag locations as grouping information;
modify by the one or more computing devices the grouping information over time frames of configurable duration, based on the virtual groupings by changing the list of tag locations for each virtual group as virtual group membership changes; and
applying by the one or more computing devices, a rules set to the grouping information to track and detect individuals within the virtual groupings.

13. The method of claim 12 further comprising:
receiving by the one or more computing devices, modifications of the rules; and
updating sensors on the network according to the modifications made to the rules.

14. The method of claim 12 wherein locations of individuals are determined by triangulation of credential data from at least one of plural credential reading devices or transmission power level sweeping.

15. The method of claim 12, further comprising:
computing by an application running on a network gateway system, the location of each of the individuals; and
scanning by an application running in the network gateway system the list of tag locations.

16. The method of claim 12 wherein the groupings are dynamic in that the groupings form, dissolve, and otherwise change in real-time as new information is made available regarding current locations of the individuals.

17. The method of claim 12 wherein the groupings are "fuzzy" in that a given individual is assigned to a group with a certain degree of certainty/uncertainty derived from past experience.

18. The method of claim 12 wherein the one or more computing devices are further configured to:
apply rules that define a test for virtual group membership.

19. The method of claim 12 wherein the one or more computing devices is a plurality of distributed devices of a set of end-nodes and combinations of network nodes and host systems and applying rules further comprises:
applying by the distributed devices the rules that are context specific rules or sets of rules that are application code modules loaded into the devices and that change over time, using real-time code relocation and execution.

20. The method of claim 12 wherein the one or more computing devices is a plurality of distributed devices of a set of end-nodes and combinations of network nodes and host systems and applying rules further comprises:
applying by the distributed devices the rules that are context specific rules or sets of rules that are application code modules loaded into the devices and that change over time, using real-time code relocation and execution and with the context specific rule implement application logic for context specific management to determine associations among individuals based on a determined associative expectation.

* * * * *